(12) United States Patent
Greene et al.

(10) Patent No.: US 7,219,211 B1
(45) Date of Patent: May 15, 2007

(54) PRECOMPUTE LOGIC FOR SOFTWARE PACKET PROCESSING

(75) Inventors: Spencer Greene, Palo Alto, CA (US); James Washburn, Palo Alto, CA (US); Olaf Möller, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 563 days.

(21) Appl. No.: 10/298,606

(22) Filed: Nov. 19, 2002

(51) Int. Cl.
*G06F 12/00* (2006.01)

(52) U.S. Cl. ..................................... 711/216
(58) Field of Classification Search ............... 711/216
See application file for complete search history.

(56) References Cited

U.S. PATENT DOCUMENTS

| | | | | |
|---|---|---|---|---|
| 6,141,421 | A * | 10/2000 | Takaragi et al. ............. 380/30 |
| 6,167,480 | A * | 12/2000 | Williams et al. ............ 710/260 |
| 6,173,384 | B1 * | 1/2001 | Weaver ....................... 711/216 |
| 6,181,698 | B1 * | 1/2001 | Hariguchi .................... 370/392 |
| 6,223,172 | B1 * | 4/2001 | Hunter et al. .................. 707/3 |
| 6,301,629 | B1 * | 10/2001 | Sastri et al. ................. 710/305 |
| 6,487,626 | B2 * | 11/2002 | Gray et al. ................... 710/305 |
| 6,570,884 | B1 * | 5/2003 | Connery et al. ............. 370/419 |
| 6,578,131 | B1 * | 6/2003 | Larson et al. ................ 711/216 |
| 6,675,163 | B1 * | 1/2004 | Bass et al. ....................... 707/6 |
| 6,697,276 | B1 * | 2/2004 | Pereira et al. ................ 365/493 |
| 6,907,466 | B2 * | 6/2005 | Alexander, Jr. et al. ..... 709/232 |
| 6,915,344 | B1 * | 7/2005 | Rowe et al. .................. 709/224 |
| 2002/0097724 | A1 * | 7/2002 | Halme et al. ................. 370/392 |
| 2002/0161911 | A1 * | 10/2002 | Pinckney et al. ............ 709/231 |
| 2003/0177435 | A1 * | 9/2003 | Budd et al. ................... 714/776 |
| 2003/0189932 | A1 * | 10/2003 | Ishikawa et al. ............. 370/392 |
| 2004/0034823 | A1 * | 2/2004 | Watkins et al. .............. 714/724 |

OTHER PUBLICATIONS

"A Packet Classification and Filter Management System," V. Srinivasan, Proceedings of IEEE Infocom, 2001, 2001, vol. 3, pp. 1464-1473.*
"Efficient Simulation Compute Power with Enhanced Testcase Generation Scheme," R. Jesssani, S. Malllick, R. Patel, and L. Powell, IBM Technical Disclosure bulletin, 1996, vol. 39, No. 05, pp. 163-166.*
A. Rijsinghani: "Computation of the Internet Checksum via Incremental Update," Request for Comments: 1624, May 1994, pp. 1-6.

* cited by examiner

*Primary Examiner*—Matthew Kim
*Assistant Examiner*—Michael Krofcheck
(74) *Attorney, Agent, or Firm*—Harrity Snyder LLP

(57) ABSTRACT

A system precomputes data for possible use by a processor. The system receives data units, and determines the types of the data units. The system then identifies one or more bit masks based on the types of the data units, where the one or more bit masks include bits corresponding to at least some portions of the data units. The system uses the one or more bit masks to select one or more portions of the data units and perform one or more functions using the one or more portions of the data units to generate function results. The system stores the function results in a first memory for subsequent selective use by the processor, and stores the data units in a second memory for subsequent retrieval by the processor.

56 Claims, 16 Drawing Sheets

| | |
|---|---|
| MASK 0 | MASK 1 |
| MASK 0 | MASK 1 |
| MASK 0 | MASK 1 |
| MASK 0 | MASK 1 |

PACKET TYPE 0
PACKET TYPE 1
PACKET TYPE 2
PACKET TYPE 3

⋯

| | |
|---|---|
| MASK 0 | MASK 1 |

PACKET TYPE N

| | | | |
|---|---|---|---|
| PACKET TYPE 0 | HASH MASK 0 | HASH MASK 1 | UDP MASK | RHS MASK |
| PACKET TYPE 1 | HASH MASK 0 | HASH MASK 1 | UDP MASK | RHS MASK |
| PACKET TYPE 2 | HASH MASK 0 | HASH MASK 1 | UDP MASK | RHS MASK |
| PACKET TYPE 3 | HASH MASK 0 | HASH MASK 1 | UDP MASK | RHS MASK |
| ... | | | | |
| PACKET TYPE N | HASH MASK 0 | HASH MASK 1 | UDP MASK | RHS MASK |

PRECOMPUTE LOGIC FOR SOFTWARE PACKET PROCESSING

BACKGROUND OF THE INVENTION

1. Field of the Invention

The present invention relates generally to data processing and, more particularly, to systems and methods for precomputing data in a software packet processing environment.

2. Description of Related Art

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, new routers were designed. One type of new router is a processor-based software packet processing system. A processor-based software packet processing system generally includes a processor connected to a memory system via an interface. The interface performs no autonomous forwarding of packets, but simply stores them for processing by the processor.

Software packet processing systems are very flexible and can implement very complex functions. The performance of the software packet processing systems is poor, however, relative to what is possible with dedicated hardware packet processing.

As a result, there is a need for mechanisms for improving the performance of a software packet processing system.

SUMMARY OF THE INVENTION

Systems and methods consistent with the principles of the invention address this and other needs by providing precompute logic that operates on packets, on-the-fly, to precompute values that may be of some use to a packet processor within a software packet processing system.

One aspect consistent with the principles of the invention includes a system that precomputes data for possible use by a processor. The system receives data units, and determines the types of the data units. The system then identifies one or more bit masks based on the types of the data units, where the one or more bit masks include bits corresponding to at least some portions of the data units. The system uses the one or more bit masks to select one or more portions of the data units and perform one or more functions using the one or more portions of the data units to generate function results. The system stores the function results in a first memory for subsequent selective use by the processor, and stores the data units in a second memory for subsequent retrieval by the processor.

In another aspect consistent with the principles of the invention, a method for precomputing data by an interface connected to a processor is provided. The method includes receiving data units; identifying one or more portions of the data units; and generating hash keys based on the one or more portions of the data units. The method further includes performing hash functions using the hash keys to generate hash results; storing the hash results in a first memory for subsequent selective use by the processor; and storing the data units in a second memory for subsequent retrieval by the processor.

In yet another aspect consistent with the principles of the invention, an interface is connected to a processor. The interface includes a first memory and an engine. The first memory is configured to store information regarding data units. The engine is configured to select one or more portions of the data units and perform checksum functions based on the one or more portions of the data units to generate checksum results. The engine is further configured to store the checksum results in the first memory for subsequent selective use by the processor, and store the data units in a second memory for subsequent retrieval by the processor.

In a further implementation consistent with the principles of the invention, a network device is provided. The network device includes a first memory, a processor, and an interface. The first memory is configured to store data units. The processor is configured to operate upon the data units. The interface connects to the first memory and the processor. The interface includes a second memory and an engine. The second memory is configured to store information relating to the data units. The engine is configured to determine the types of the data units and identify one or more bit masks based on the types of the data units. The one or more bit masks include bits corresponding to at least some portions of the data units. The engine is further configured to use the one or more bit masks to select one or more portions of the data units, perform at least one function using the one or more portions of the data units to generate function results, store the function results in the second memory for subsequent selective use by the processor, and store the data units in the first memory for subsequent retrieval by the processor.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a diagram of an exemplary table that may be used to identify hash bit masks to be used in performing a hash function according to an implementation consistent with the principles of the invention;

FIG. 16 is a diagram of an exemplary table that may be used to identify one or more bit masks to be used in performing a hash, UDP checksum, and/or RHS function according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide precompute logic that operates upon received packets to precompute one or more values in real time for possible use by a packet processor within a software packet processing system.

Exemplary System Overview

Figure 1:
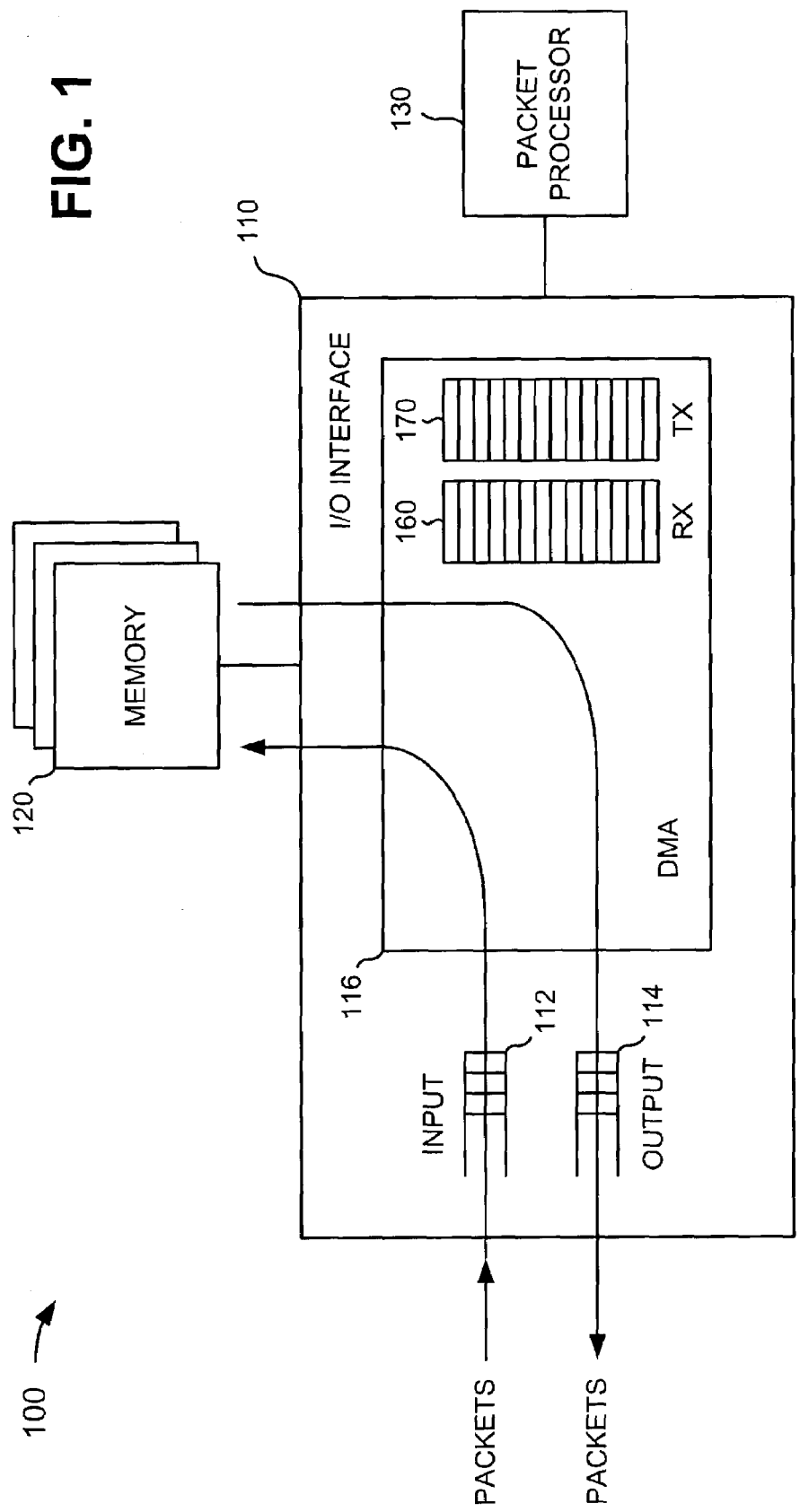
FIG. 1 is a block diagram illustrating an exemplary system in which systems and methods consistent with the principles of the invention may be implemented.

FIG. 1 is a block diagram illustrating an exemplary system 100 in which systems and methods consistent with the principles of the invention may be implemented. In one implementation consistent with the principles of the invention, system 100 may be configured as a network device, such as a router or a switch, or an element within a network device. For example, system 100 may include an input/output (I/O) interface 110 connected to a memory 120 and a packet processor 130.

Memory 120 may include one or more memory banks or separate memory devices, such as one or more dynamic random access memories (DRAMs). Packet processor 130 may include logic that processes packets, as necessary, to prepare the packets for transmission from system 100. For example, packet processor 130 may analyze and/or process portions of the packets to determine how to route the packets.

I/O interface 110 may include an input buffer 112, an output buffer 114, and a direct memory access (DMA) engine 116. Input buffer 112 may include a memory, such as a first-in, first-out (FIFO) buffer, that may temporarily store packets received via one or more input ports. Output buffer 114 may include a memory, such as a FIFO buffer, that may temporarily store packets prior to transmitting the packets via one or more output ports. DMA engine 116 may include DMA logic that reads packets from input buffer 112 and stores them in memory 120 and reads packets from memory 120 and stores them in output buffer 114.

DMA engine 116 may include a receive descriptor memory (RX) 160 and transmit descriptor memory (TX) 170. In an alternate implementation consistent with the principles of the invention, receive descriptor memory 160 and/or transmit descriptor memory 170 are stored within memory 120. Receive descriptor memory 160 and transmit descriptor memory 170 may store information (receive and transmit descriptors, respectively) regarding packets stored in memory 120. For example, the information may include how long a packet is, where the packet is stored in memory 120, and/or a time stamp of when the packet was received.

Generally, system 100 operates as follows. Input buffer 112 may receive packets and temporarily store them. DMA engine 116 may read the packets and store them in memory 120. DMA engine 116 may write receive descriptors, corresponding to the packets, in receive descriptor memory 160. Thereafter, packet processor 130 may access packets that it needs for processing. For example, packet processor 130 may use the receive descriptors stored in receive descriptor memory 160 to locate and retrieve packets from memory 120.

When packet processor 130 finishes processing a packet, it may drop the packet or transmit the packet via one or more output ports. To transmit a packet, packet processor 130 may store a transmit descriptor in transmit descriptor memory 170 that instructs DMA engine 116 where to locate the packet and send it out. DMA engine 116 may retrieve the packet from memory 120 using the transmit descriptor and store it in output buffer 114. Output buffer 114 may temporarily store the packet and output it via one or more output ports. 100361 Because I/O interface 110 performs no autonomous forwarding of packets, system 100 may be considered to be a software packet processing system. I/O interface 110 may receive packets and store them in memory 120. I/O interface 110 may not contain the necessary mechanisms for converting a received packet into a form for transmitting from I/O interface 110.

In an implementation consistent with the principles of the invention, system 100 performs three functions: hash functions, User Datagram Protocol (UDP) checksum functions, and receive header store (RHS) functions. System 100 may perform one of these functions or a combination of these functions. The individual functions will now be described in more detail.

Exemplary Hash Configuration

Figure 2:
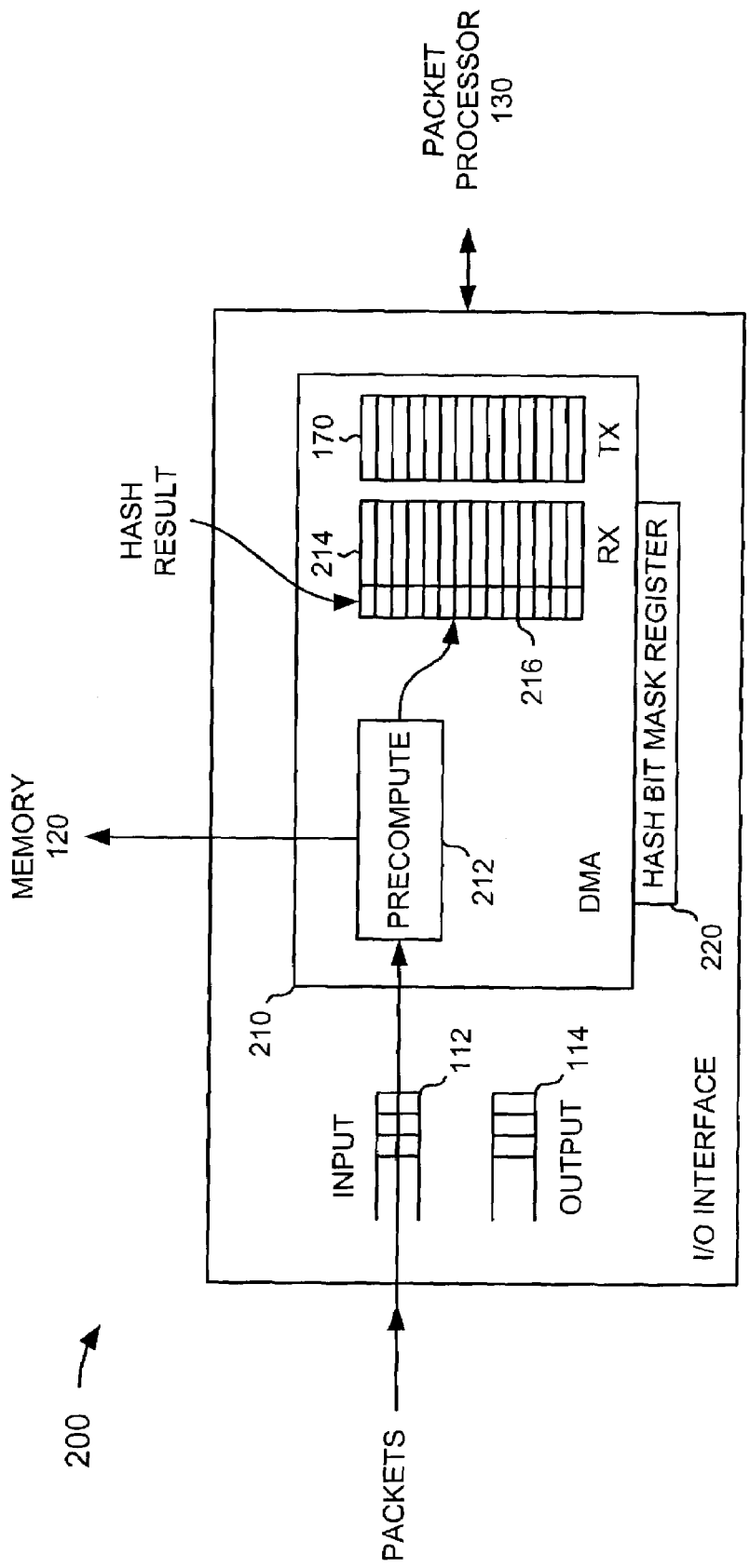
FIG. 2 is an exemplary diagram of an input/output (I/O) interface for performing hashing functions according to an implementation consistent with the principles of the invention.

FIG. 2 is an exemplary diagram of an I/O interface 200 that performs hashing functions according to an implementation consistent with the principles of the invention. Input/output interface 200 may include input buffer 112, output buffer 114, DMA engine 210, and hash bit mask register 220. Input buffer 112 and output buffer 114 may be configured similarly as described above with regard to FIG. 1 and, therefore, will not be described further.

DMA engine 210 may include precompute logic 212, receive descriptor memory 214, and transmit descriptor memory 170. Transmit descriptor memory 170 may be configured similarly as described above with regard to FIG. 1 and, therefore, will not be described further.

Precompute logic 212 may include logic that performs a hash function on some or all of the received packets in real time (i.e., as the packets are received from input buffer 112 and stored in memory 120). Receive descriptor memory 214 may store information as described above with regard to FIG. 1, but may also include an additional field (i.e., hash result field 216) that stores hash results from precompute logic 212. Hash bit mask register 220 may store a bit mask that specifies to precompute logic 212 which data units of a packet to consider in the hash function and which data units to ignore.

Figure 3:
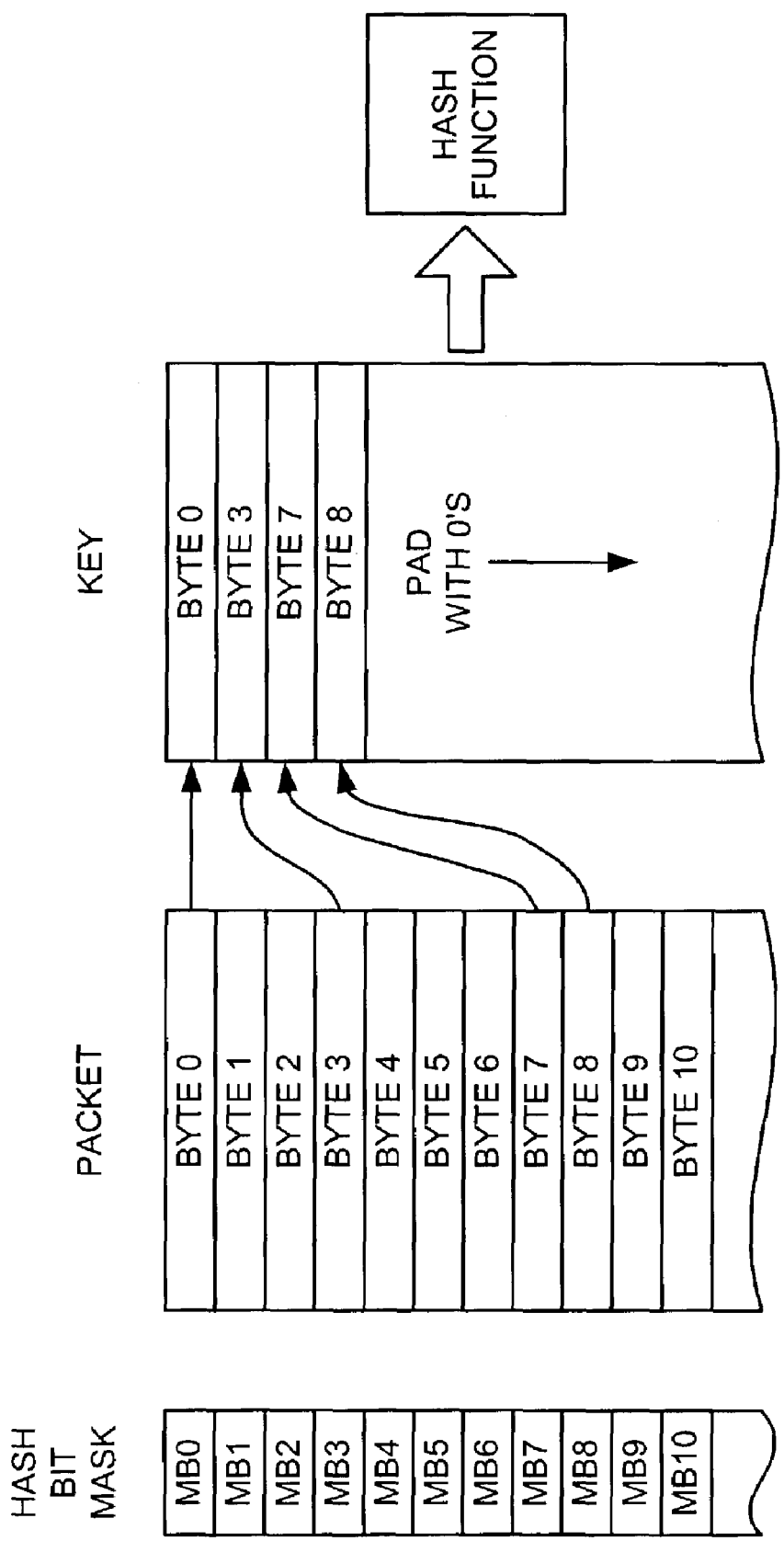
FIG. 3 is an exemplary diagram of a hashing function according to an implementation consistant with the principles of the invention.

FIG. 3 is an exemplary diagram of a hashing function according to an implementation consistent with the principles of the invention. A packet typically includes a series of data units, such as 8 bit bytes or 32 bit words. For example, the data units may correspond to a series of fields that are each dedicated to a particular purpose or any other data or combination of data in a packet. In the description that follows, a packet will be described as including a series of bytes. It is to be understood that data units of a packet can be of any length, not necessarily just bytes. It is also possible for the data units to have varying lengths.

Precompute logic 212 generates a hash key from some number of bytes of the packet. These bytes do not necessarily need to be contiguous bytes. Precompute logic 212 uses the hash bit mask from hash bit mask register 220 to identify the particular bytes of the packet to be used to generate the hash key. The hash bit mask includes a number of bits (MB#) corresponding to some number of bytes of the packet. Each bit (MB#) may specify whether the corresponding packet byte should be included in the hash key. Using the hash bit mask, any combination of bytes of the packet may be included in the hash key.

Precompute logic 212 may form the hash key from the bytes identified by the hash bit mask. The hash key may have a fixed size (e.g., equal in length to the size of the packet). In this case, precompute logic 212 may form the hash key from the identified bytes and pad the rest with a predetermined value, such as zero. Precompute logic 212 may then perform a hash function on the hash key to generate a hash result that is somewhat smaller (e.g., fewer bits) than the hash key. Hash functions are known in the art and the particular type of hash function performed by precompute logic 212 may be programmable. Precompute logic 212 may store the hash result in hash result field 216 of receive descriptor memory 214.

Figure 4:
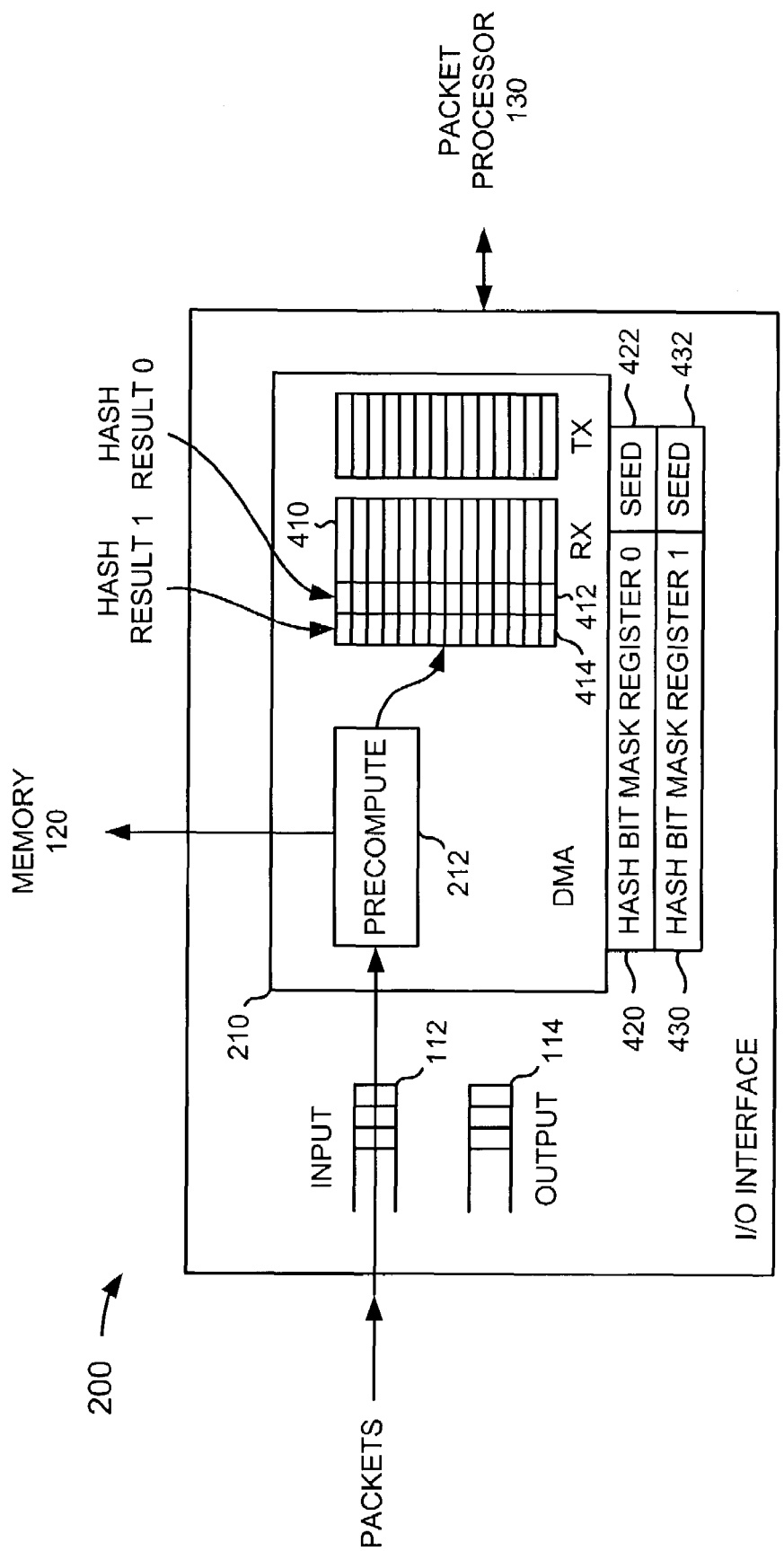
FIG. 4 is an exemplary diagram of the I/O interface of FIG. 2 according to another implementation consistent with the principles of the invention.

FIG. 4 is an exemplary diagram of I/O interface 200 according to another implementation consistent with the principles of the invention. In this case, receive descriptor memory 410 includes two additional fields: a hash result field 412 and a hash result field 414. Also, I/O interface 200 includes two hash bit mask registers 420 and 430. Hash bit mask registers 420 and 430 may store the same or different bit masks.

In this implementation, precompute logic 212 may perform two hash functions in parallel on each packet to generate two hash results. Precompute logic 212 may use the contents of hash bit mask registers 420 and 430 to determine which bytes of a packet to consider when performing the hashing functions. Precompute logic 212 may store the hash results in hash result fields 412 and 414.

Seed values 422 and 432 may be associated with hash bit mask registers 420 and 430, respectively. Seed values 422 and 432 may be used for collision resolution. For example, if hash bit mask registers 420 and 430 store identical hash bit masks and seed values 422 and 432 differ, then both hash results can be used in the following way. If the address formed by the first hash result points to already existing data in a table (i.e., a hash collision occurs), addresses equal to the first hash result plus multiples of the second hash result can be formed until a free memory location is found.

While two hash result fields 412 and 414 and two hash bit mask registers 420 and 430 are shown in FIG. 4, more than two hash result fields and hash bit mask registers may be used in other implementations consistent with the principles of the invention.

It may also be possible to include hash bit masks that are based on the types of packets received. For example, different types of packets may be processed by I/O interface 200 for which hash functions may be performed on different bytes of the packets. Data at a certain location in each received packet (e.g., a packet type field) may be examined to determine the packet's type. In one implementation, packet type data is prepended to each received packet. The packet type data may be used to look up one or more hash bit masks in a table.

FIG. 5 is a diagram of an exemplary table 500 that may be used to identify hash bit masks to be used in performing a hash function according to an implementation consistent with the principles of the invention. Table 500 may include entries that are addressable by packet type data extracted from received packets. Each of the entries may include one or more hash bit masks that are to be used by precompute logic 212 when performing the hashing function.

Figure 6:
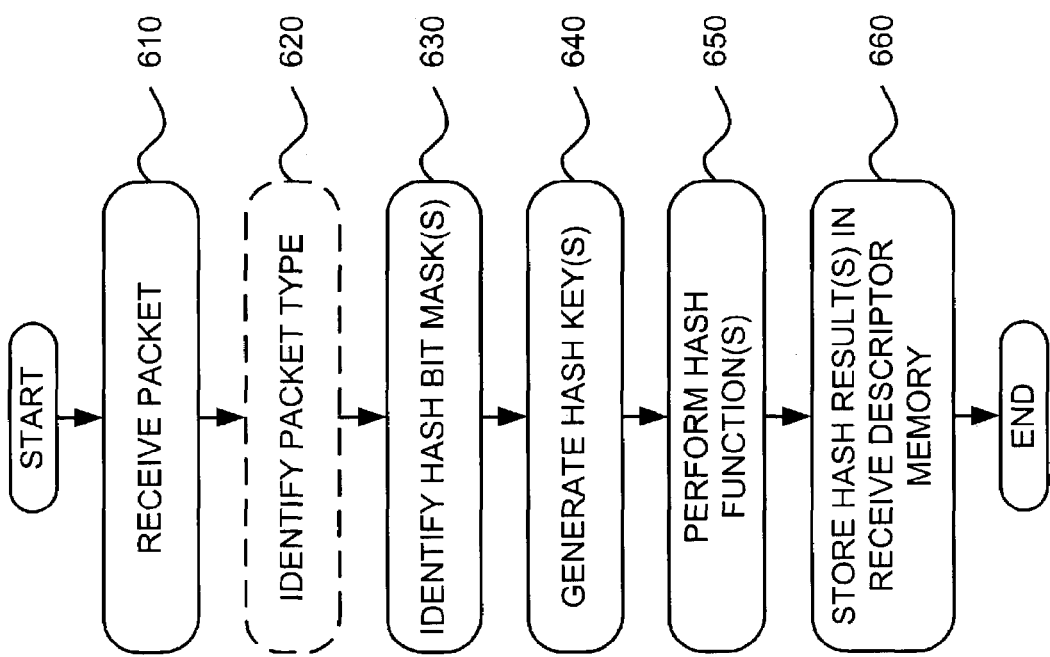
FIG. 6 is a flowchart of exemplary processing for performing hashing functions according to an implementation consistent with the principles of the invention.

FIG. 6 is a flowchart of exemplary processing for performing hashing functions according to an implementation consistent with the principles of the invention. Processing may begin with the receipt of a packet by precompute logic 212 of DMA engine 210 (act 610). For example, precompute logic 212 may read the next packet from input buffer 112.

Precompute logic 212 may optionally identify the packet type (or other information) associated with the packet (act 620). For example, precompute logic 212 may examine data at a particular location within the packet, such as prepended to the beginning of the packet or within a packet type field located in the header of the packet, to identify the packet's type.

Precompute logic 212 may identify the hash bit mask(s) associated with the packet (act 630). For example, precompute logic 212 may read the hash bit mask(s) from hash bit mask register 420 and/or hash bit mask register 430. If a table is used, similar to table 500 (FIG. 5), then precompute logic 212 may use the packet type as a pointer into table 500 to identify the hash bit mask(s) associated with the packet.

Precompute logic 212 may generate one or more hash key(s) (act 640). If more than one hash bit mask is used, then precompute logic 212 may generate more than one hash key. Precompute logic 212 may then perform a hash function using the hash key(s) to generate hash result(s) (act 650). The particular type of hash function performed may be programmable. Precompute logic 212 may store the hash result(s) in the appropriate field(s) of receive descriptor memory 410, such as hash result fields 412 and/or 414 (act 660).

Thereafter, packet processor 130 may access the information in receive descriptor memory 410, including the hash results. If packet processor 130 needs the hash results for a table lookup, for example, packet processor 130 need not waste the time and resources to retrieve the packet from memory 120 and perform the hashing functions itself. Instead, packet processor 130 may read the hash results from receive descriptor memory 410 and use the hash results as a pointer into the lookup table.

Exemplary UDP Configuration

Figure 7:
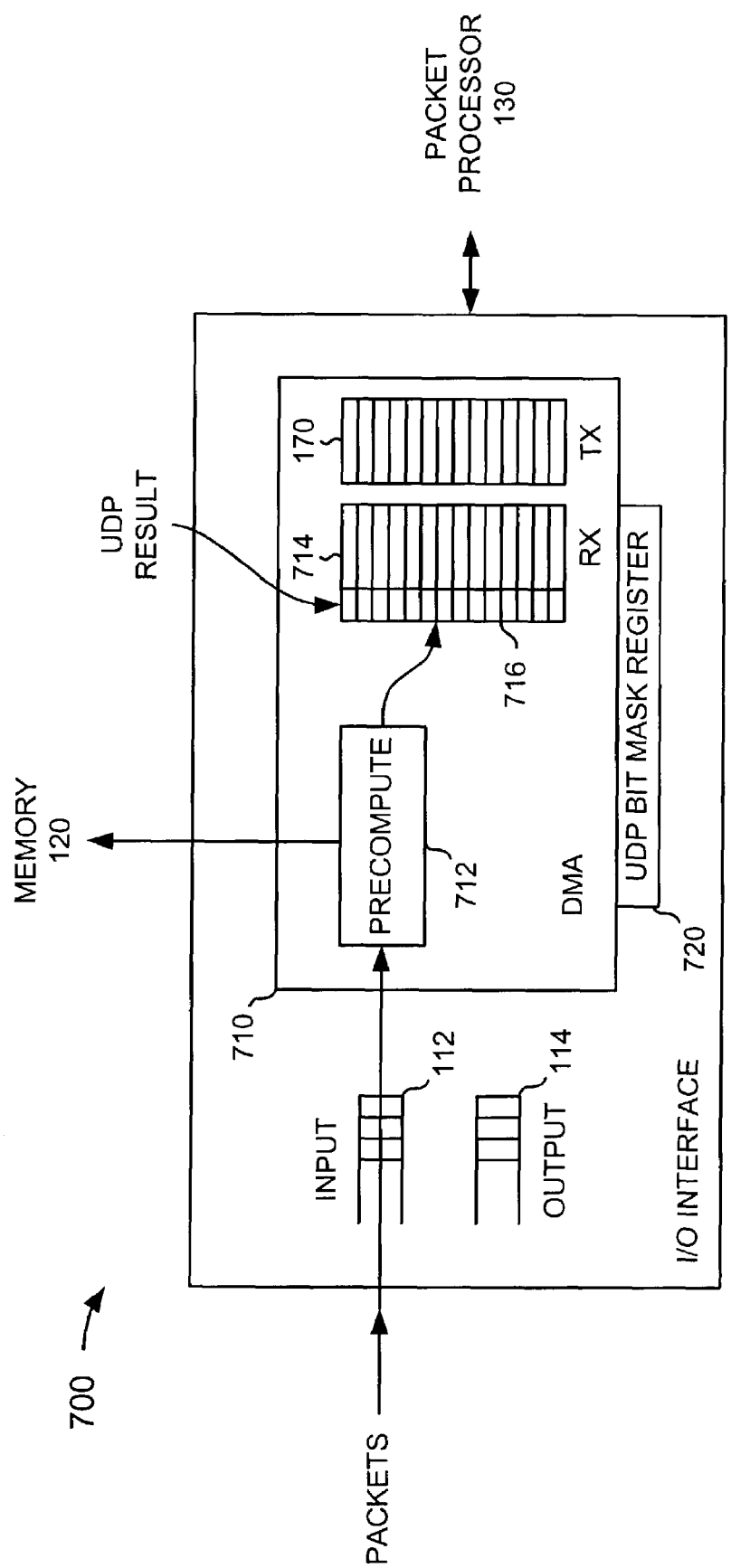
FIG. 7 is an exemplary diagram of an I/O interface for performing User Datagram Protocol (UDP) checksum functions according to an implementation consistent with the principles of the invention.

FIG. 7 is an exemplary diagram of an I/O interface 700 that performs UDP checksum functions according to an implementation consistent with the principles of the invention. Input/output interface 700 may include input buffer 112, output buffer 114, DMA engine 710, and UDP bit mask register 720. Input buffer 112 and output buffer 114 may be configured similarly as described above with regard to FIG. 1 and, therefore, will not be described further.

DMA engine 710 may include precompute logic 712, receive descriptor memory 714, and transmit descriptor memory 170. Transmit descriptor memory 170 may be configured similarly as described above with regard to FIG. 1 and, therefore, will not be described further.

Precompute logic 712 may include logic that performs a UDP checksum function on some or all received packets in real time (i.e., as the packets are received from input buffer 112 and stored in memory 120). Receive descriptor memory 714 may store information as described above with regard to FIG. 1, but may also include an additional field (i.e., UDP result field 716) that stores UDP checksum results from precompute logic 712. UDP bit mask register 720 may store a bit mask that specifies to precompute logic 712 which data units of a packet to consider in the UDP checksum function and which data units to ignore.

Figure 8:
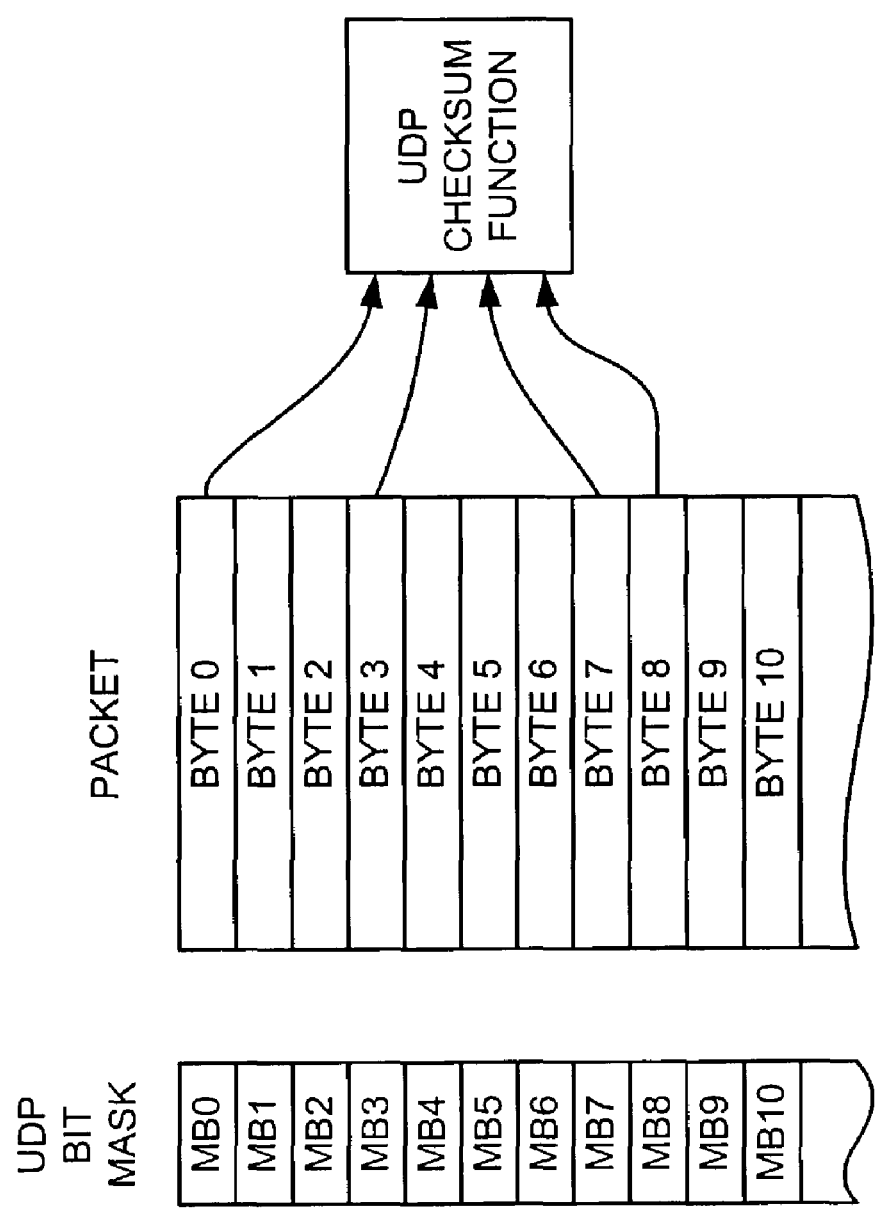
FIG. 8 is an exemplary diagram of a UDP checksum function according to an implementation consistent with the principles of the invention.

FIG. 8 is an exemplary diagram of a UDP checksum function according to an implementation consistent with the principles of the invention. A packet typically includes a series of data units, such as 8 bit bytes or 32 bit words. For example, the data units may correspond to a series of fields that are each dedicated to a particular purpose or any other data or combination of data in a packet. In the description that follows, a packet will be described as including a series of bytes. It is to be understood that data units of a packet can be of any length, not necessarily just bytes. It is also possible for the data units to have varying lengths.

Precompute logic 712 performs a UDP checksum operation on some number of bytes of the packet. These bytes do not necessarily need to be contiguous bytes. Precompute logic 712 uses the UDP bit mask from UDP bit mask register 720 to identify the particular bytes of the packet to be used for the UDP checksum function. The UDP bit mask includes a number of bits (MB#) corresponding to some number of bytes of the packet. Each bit (MB#) may specify whether the corresponding packet byte should be used for the UDP checksum function. Using the UDP bit mask, any combination of bytes of the packet may be used for the UDP checksum function.

Precompute logic 712 may perform a UDP checksum function on the specified bytes of the packet. The UDP checksum function is a one's compliment checksum where the bytes of the packet are added together. The UDP checksum function is known in the art; see, for example, A. Rijsinghani, "Computation of the Internet Checksum via Incremental Update," Request for Comments 1624, May 1994. Precompute logic 712 may store the UDP checksum result in UDP result field 716 of receive descriptor memory 714.

It may be possible to include UDP bit masks that are based on the types of packets received. For example, different types of packets may be processed by I/O interface 700 for which UDP checksum functions may be performed on different bytes of the packets. Data at a certain location in each received packet (e.g., a packet type field) may be examined to determine the packet's type. In one implementation, packet type data is prepended to each received packet. The packet type data may be used to look up a UDP bit mask in a table.

Figure 9:
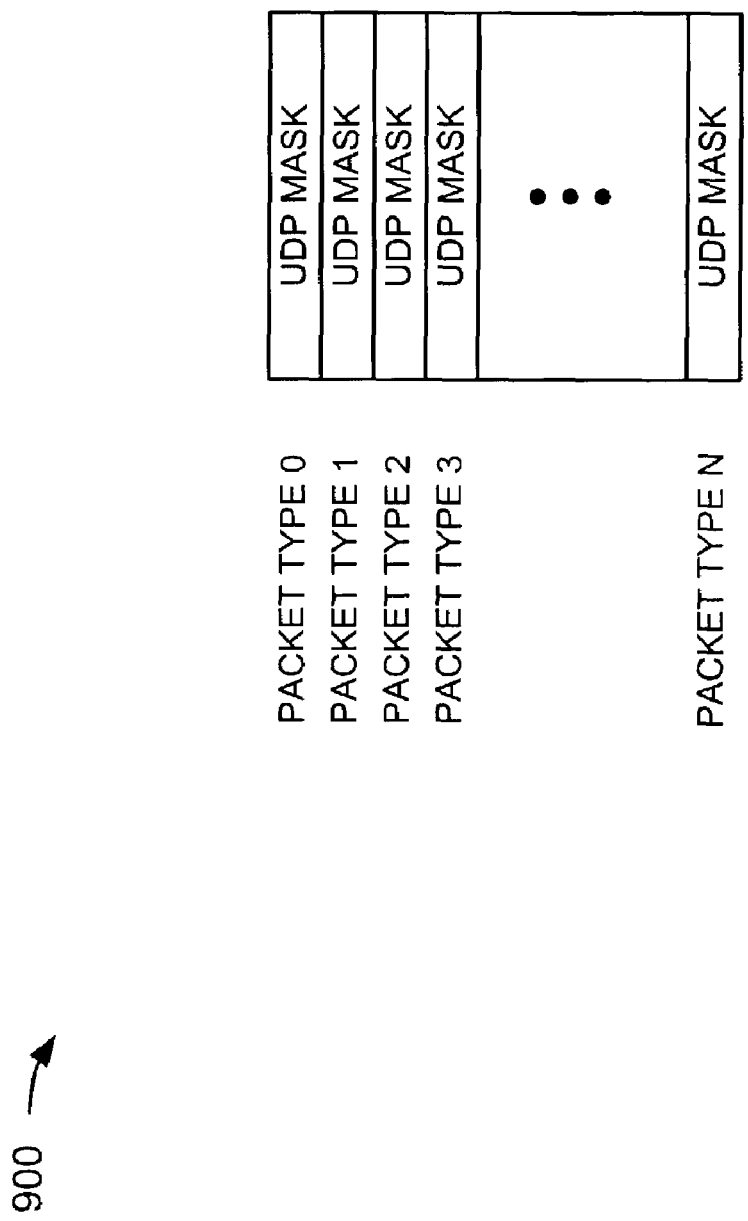
FIG. 9 is a diagram of an exemplary table that may be used to identify UDP bit masks for use in performing a UDP checksum function according to an implementation consistent with the principles of the invention.

FIG. 9 is a diagram of an exemplary table 900 that may be used to identify UDP bit masks for use in performing a UDP checksum function according to an implementation consistent with the principles of the invention. Table 900 may include entries that are addressable by packet type data extracted from received packets. Each of the entries may include a UDP bit mask that may be used by precompute logic 712 when performing the UDP checksum function.

In another implementation consistent with the principles of the invention, precompute logic 712 may perform a UDP checksum function on the entire packet. In this case, the UDP bit mask may be unnecessary. In this case, precompute logic 712 may store the UDP results in UDP result field 716 of receive descriptor memory 714. Packet processor 130 may, thereafter, retrieve the UDP checksum results from receive descriptor memory 714 and subtract out the bytes that it desires to exclude from the results.

Figure 10:
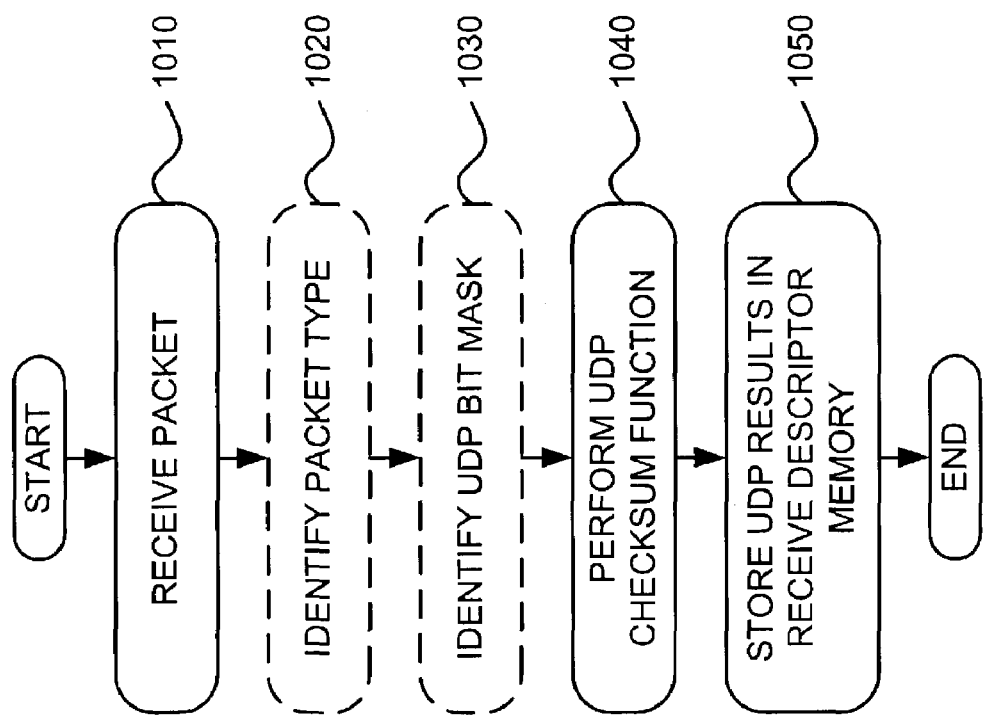
FIG. 10 is a flowchart of exemplary processing for performing UDP checksum functions according to an implementation consistent with the principles of the invention.

FIG. 10 is a flowchart of exemplary processing for performing UDP checksum functions according to an implementation consistent with the principles of the invention. Processing may begin with the receipt of a packet by precompute logic 712 of DMA engine 710 (act 1010). For example, precompute logic 712 may read the next packet from input buffer 112.

Precompute logic 712 may optionally identify the packet type associated with the packet (act 1020). For example, precompute logic 712 may examine data at a particular location within the packet, such as prepended to the beginning of the packet or within a packet type field located in the header of the packet, to identify the packet's type.

Precompute logic 712 may optionally identify the UDP bit mask associated with the packet (act 1030). For example, precompute logic 712 may read the UDP bit mask from UDP bit mask register 720. If a table is used, similar to table 900 (FIG. 9), then precompute logic 712 may use the packet type as a pointer into table 900 to identify the UDP bit mask associated with the packet.

Precompute logic 712 may perform a UDP checksum function on the packet (act 1040). In one implementation, precompute logic 712 performs a UDP checksum function on particular bytes of the packet identified by the UDP bit mask. In another implementation, precompute logic 712 performs a UDP checksum function on the entire packet. The particular type of UDP checksum function performed may be programmable. Precompute logic 712 may store the UDP results in the appropriate field of receive descriptor memory 714, such as UDP result field 716 (act 1050).

Thereafter, packet processor 130 may access the information in receive descriptor memory 714, including the UDP checksum results. As a result, packet processor 130 need not waste the time and resources to retrieve the packet from memory 120 and perform the UDP checksum function itself.

Exemplary RHS Configuration

Figure 11:
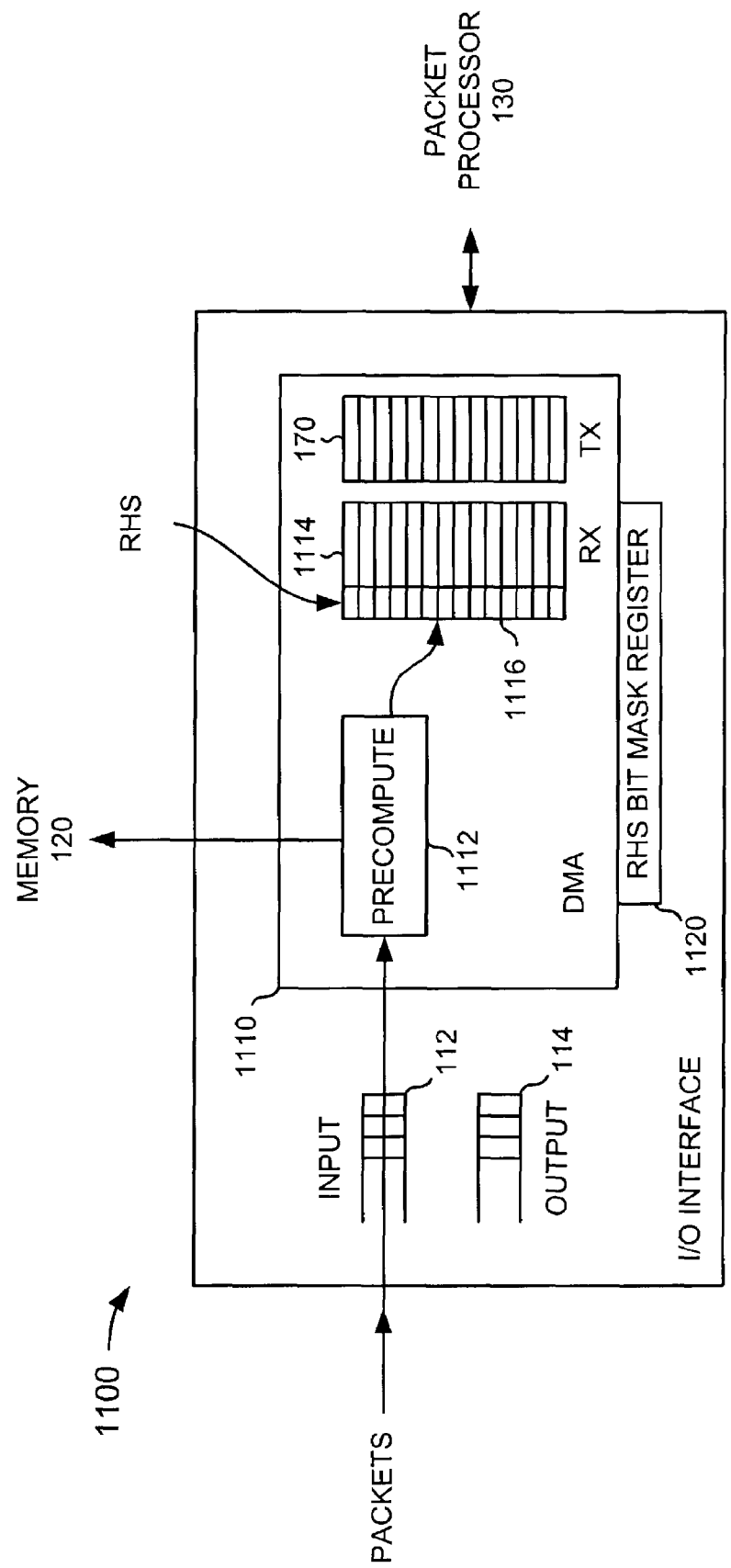
FIG. 11 is an exemplary diagram of an I/O interface for performing receive header store (RHS) functions according to an implementation consistent with the principles of the invention.

FIG. 11 is an exemplary diagram of an I/O interface 1100 for performing RHS functions according to an implementation consistent with the principles of the invention. The RHS function may include the storing of certain packet data in memory.

According to FIG. 11, I/O interface 1100 may include input buffer 112, output buffer 114, DMA engine 1110, and RHS bit mask register 1120. Input buffer 112 and output buffer 114 may be configured similarly as described above with regard to FIG. 1 and, therefore, will not be described further. DMA engine 1110 may include precompute logic 1112, receive descriptor memory 1114, and transmit descriptor memory 170. Transmit descriptor memory 170 may be configured similarly as described above with regard to FIG. 1 and, therefore, will not be described further.

Precompute logic 1112 may include logic that performs an RHS function on some or all received packets in real time (i.e., as the packets are received from input buffer 112 and stored in memory 120). Receive descriptor memory 1114 may store information as described above with regard to FIG. 1, but may also include an additional field (i.e., RHS field 1116) that stores RHS results from precompute logic 1112. RHS bit mask register 1120 may store a bit mask that specifies to precompute logic 1112 which data units of a packet to use for the RHS function and which data units to ignore.

Figure 12:
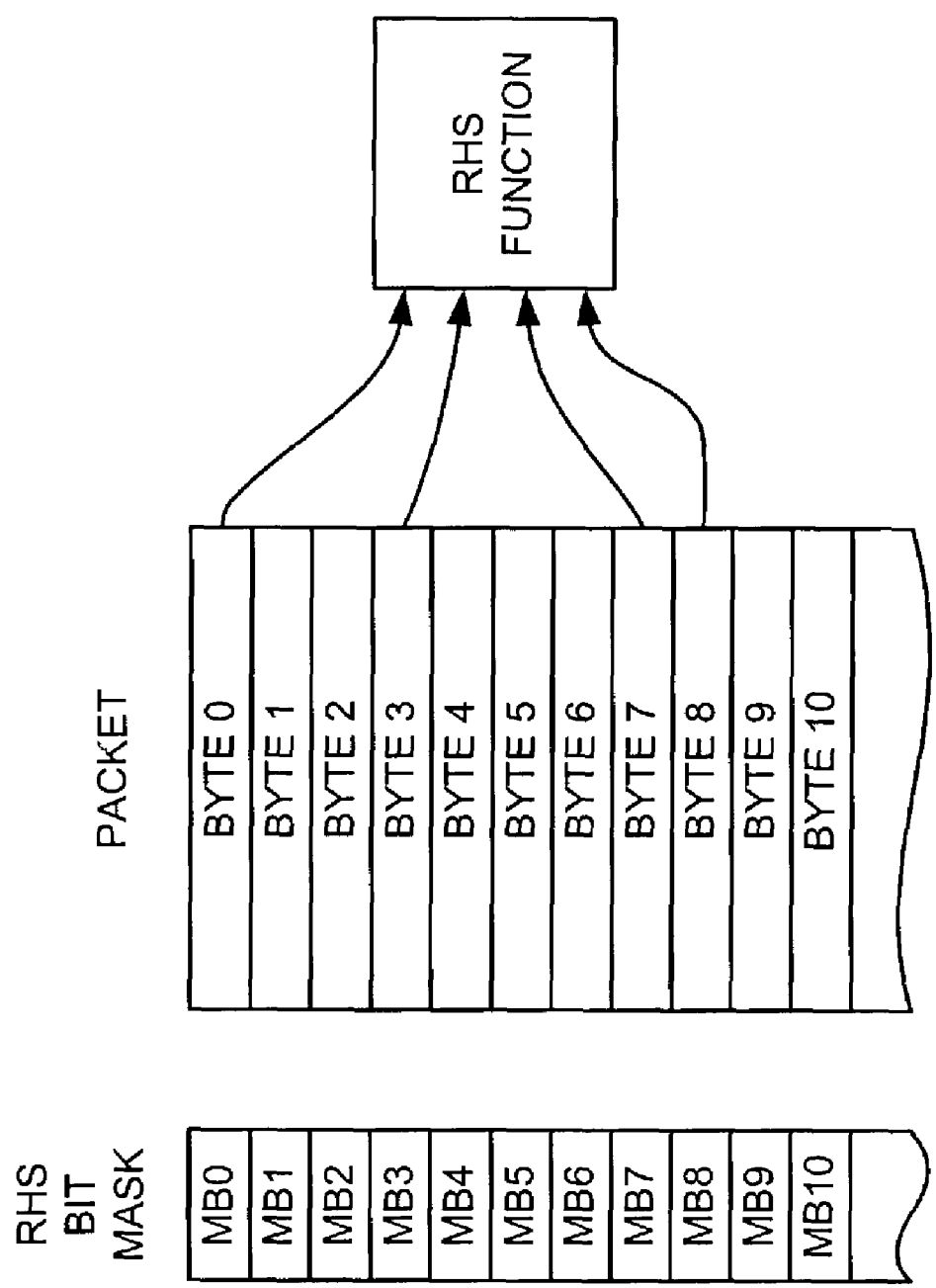
FIG. 12 is an exemplary diagram of an RHS function according to an implementation consistent with the principles of the invention.

FIG. 12 is an exemplary diagram of an RHS function according to an implementation consistent with the principles of the invention. A packet typically includes a series of data units, such as 8 bit bytes or 32 bit words. For example, the data units may correspond to a series of fields that are each dedicated to a particular purpose or any other data or combination of data in a packet. In the description that follows, a packet will be described as including a series of bytes. It is to be understood that data units of a packet can be of any length, not necessarily just bytes. It is also possible for the data units to have varying lengths.

Precompute logic 1112 performs an RHS operation on some number of bytes of the packet. These bytes do not necessarily need to be contiguous bytes. Precompute logic 1112 uses the RHS bit mask from RHS bit mask register 1120 to identify the particular bytes of the packet to be used for the RHS function. The RHS bit mask includes a number of bits (MB#) corresponding to some number of bytes of the packet. Each bit (MB#) may specify whether the corresponding packet byte should be used for the RHS function. Using the RHS bit mask, any combination of bytes of the packet may be used for the RHS function.

In another implementation consistent with the principles of the invention, precompute logic 1112 may use start-offset and end-offset pairs to identify the particular bytes of the packet to store in RHS field 1116. In this case, the RHS bit mask may be unnecessary.

Precompute logic 1112 may perform an RHS function on the specified bytes of the packet. The RHS function includes the storing of certain bytes (e.g., header bytes) of the packet in RHS field 1116 of receive descriptor memory 1114.

It may be possible to include RHS bit masks that are based on the types of packets received. For example, different types of packets may be processed by I/O interface 100 for which RHS functions may be performed using different bytes of the packets. Data at a certain location in each received packet (e.g., a packet type field) may be examined to determine the packet's type. In one implementation, packet type data is prepended to each received packet. The packet type data may be used to look up an RHS bit mask in a table.

Figure 13:
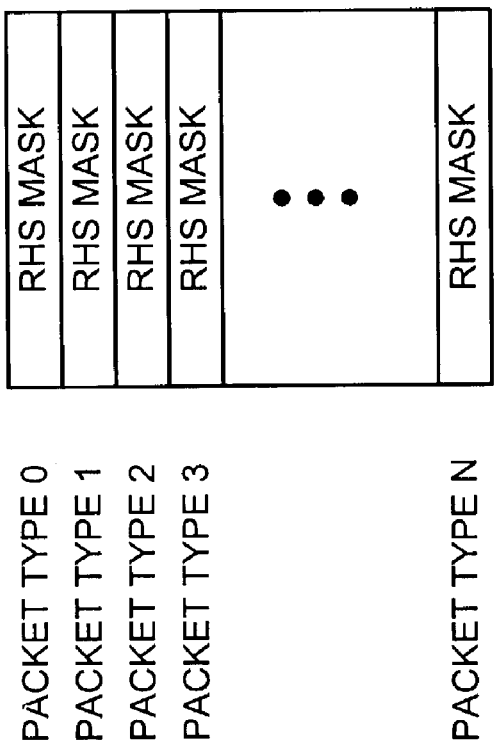
FIG. 13 is a diagram of an exemplary table that may be used to identify RHS bit masks to be used in performing an RHS function according to an implementation consistent with the principles of the invention.

FIG. 13 is a diagram of an exemplary table 1300 that may be used to identify RHS bit masks to be used in performing an RHS function according to an implementation consistent with the principles of the invention. Table 1300 may include entries that are addressable by packet type data extracted from received packets. Each of the entries may include an RHS bit mask (or a start-offset and end-offset pair) that is to be used by precompute logic 1112 when performing the RHS function.

Packet processor 130 may, thereafter, retrieve the bytes from RHS field 1116 of receive descriptor memory 1114. As a result, packet processor 130 need not waste the time of having to read the packet from memory 120, which is a slower process.

Figure 14:
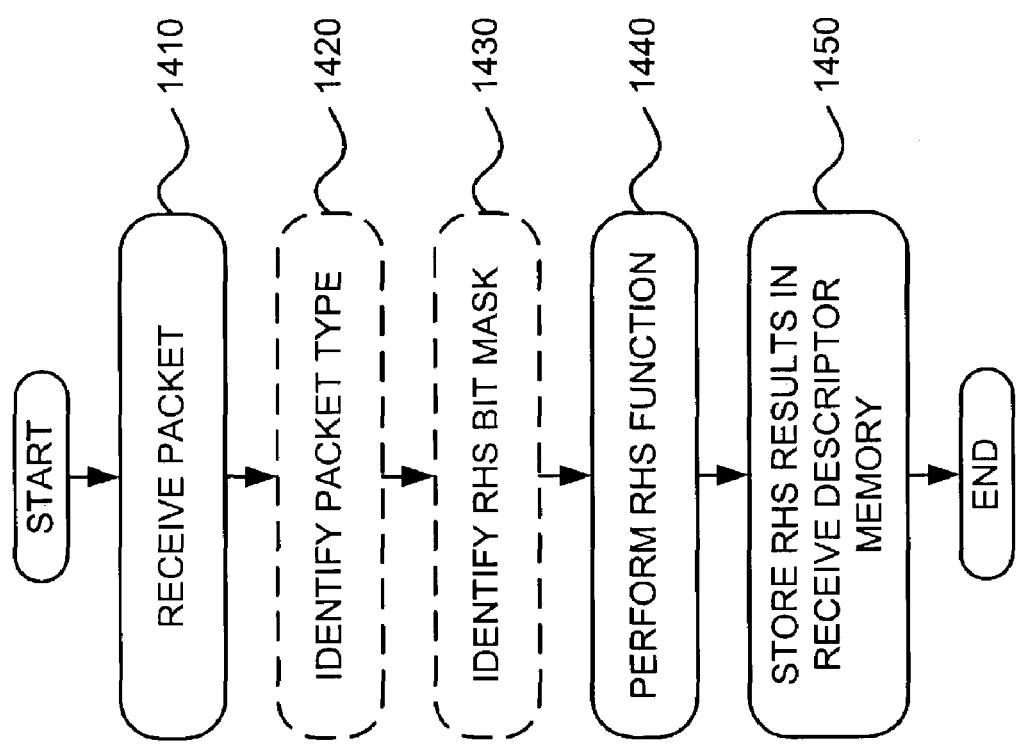
FIG. 14 is a flowchart of exemplary processing for performing RHS functions according to an implementation consistent with the principles of the invention.

FIG. 14 is a flowchart of exemplary processing for performing RHS functions according to an implementation consistent with the principles of the invention. Processing may begin with the receipt of a packet by precompute logic 1112 of DMA engine 1110 (act 1410). For example, precompute logic 1112 may read the next packet from input buffer 112.

Precompute logic 1112 may optionally identify the packet type associated with the packet (act 1420). For example, precompute logic 1112 may examine data at a particular location within the packet, such as prepended to the beginning of the packet or within a packet type field located in the header of the packet, to identify the packet's type.

Precompute logic 1112 may optionally identify the RHS bit mask associated with the packet (act 1430). For example, precompute logic 1112 may read the RHS bit mask from RHS bit mask register 1120. Alternatively, precompute logic 1112 may use start-offset and end-offset pairs to identify certain bytes within the packet. If a table is used, similar to table 1300 (FIG. 13), then precompute logic 1112 may use the packet type as a pointer into table 1300 to identify the RHS bit mask or start-offset and end-offset pair associated with the packet.

Precompute logic 1112 may perform an RHS function using particular bytes of the packet identified by the RHS bit mask or start-offset and end-offset pair (act 1440). The RHS function may involve copying the identified bytes (as RHS results) to the appropriate field of receive descriptor memory 1114, such as RHS field 1116 (act 1450).

Thereafter, packet processor 130 may access the information in receive descriptor memory 1114, including the RHS results. The connection between packet processor 130 and DMA engine 1110 is typically much faster than the connection between packet processor 130 and memory 120. As a result, packet processor 130 can access the particular bytes in RHS field 1116 much faster than the time it takes to retrieve the packet from memory 120 and extract the bytes from the packet.

Exemplary Combined Configuration

In implementations described thus far, I/O interfaces have been described that perform either hash, UDP checksum, or RHS functions. In an alternate implementation, an I/O interface may be configured to perform a combination of these functions.

Figure 15:
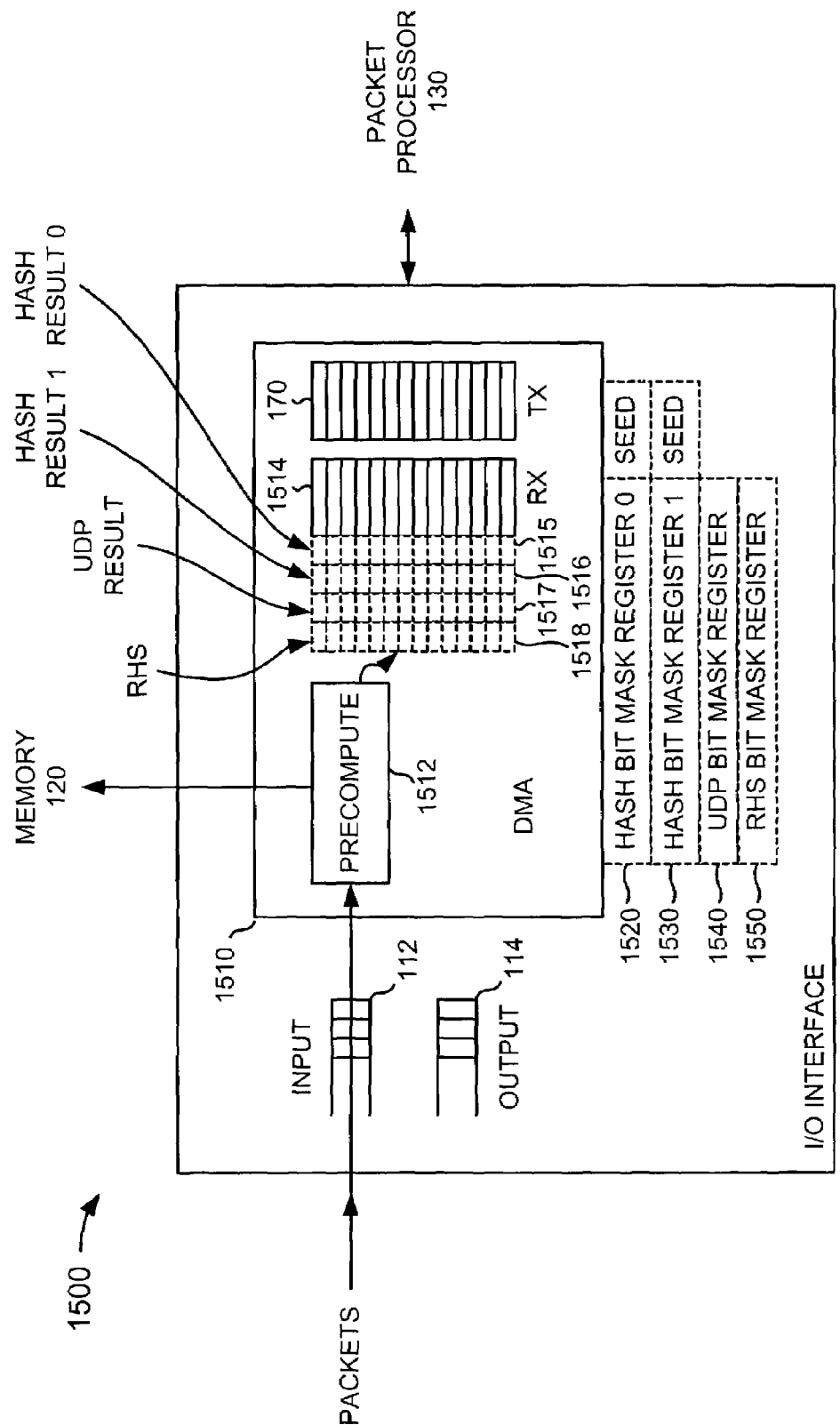
FIG. 15 is an exemplary diagram of an I/O interface according to an alternate implementation consistent with the principles of the invention.

FIG. 15 is an exemplary diagram of an I/O interface 1500 according to an alternate implementation consistent with the principles of the invention. I/O interface 1500 may include input buffer 112, output buffer 114, DMA engine 1510, hash bit mask registers 1520 and 1530, UDP bit mask register 1540, and/or RHS bit mask register 1550. Input buffer 112 and output buffer 114 may be configured similarly as described above with regard to FIG. 1 and, therefore, will not be described further.

DMA engine 1510 may include precompute logic 1512, receive descriptor memory 1514, and transmit descriptor memory 170. Transmit descriptor memory 170 may be configured similarly as described above with regard to FIG. 1 and, therefore, will not be described further.

Precompute logic 1512 may include logic that performs hash functions, UDP checksum functions, and/or RHS functions. Precompute logic 1512 may perform any combination of these functions and store its results in receive descriptor memory 1514. Receive descriptor memory 1514 may store information as described above with regard to FIG. 1, but may also include one or more additional fields, such as one or more hash result fields 1515 and 1516, a UDP result field 1517, and an RHS field 1518. Each of fields 1515–1518 may store results from the corresponding functions performed by precompute logic 1512.

Registers 1520–1550 may store bit masks similar to the ones described above. Precompute logic 1512 may use the bit masks when determining which data units of a packet to consider and which data units to ignore when performing the corresponding functions.

It may be possible to include bit masks that are based on the types of packets received. For example, different types of packets may be processed for which hash, UDP checksum, and/or RHS functions may be performed using different data units of the packets. Data at a certain location in each received packet (e.g., a packet type field) may be examined to determine the packet's type. In one implementation, packet type data is prepended to each received packet. The packet type data may be used to look up one or more bit masks in a table.

FIG. 16 is a diagram of an exemplary table 1600 that may be used to identify one or more bit masks for use in performing a hash, UDP checksum, and/or RHS function according to an implementation consistent with the principles of the invention. Table 1600 may include entries that are addressable by packet type data extracted from received packets. Each of the entries may include one or more hash bit masks, a UDP bit mask, and/or an RHS bit mask that is to be used by precompute logic 1112 when performing the corresponding function.

CONCLUSION

Systems and methods consistent with principles of the invention provide precompute logic that operates upon received packets to precompute one or more values in real time for possible use by a packet processor within a software packet processing system. For example, the precompute logic may perform hash functions, UDP checksum functions, and/or RHS functions using select portions of some or all arriving packets. Performing these functions by the precompute logic, instead of the packet processor, saves time and resources of the packet processor.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that communicates with another system, device, or chip via one or more buses.

In addition, systems and methods have been described as processing packets. In implementations consistent with the principles of the invention, data units may be processed. Data units include portions of packets, entire packets, groups of packets, as well as other, non-packet, data.

Further, certain portions of the invention have been described as "logic" that performs one or more functions. This logic may include hardware, such as an application specific integrated circuit, software executing on hardware, or a combination of hardware and software.

Also, while series of acts have been described with regard to the flowcharts of FIGS. 6, 10, and 14, the order of the acts may differ in other implementations consistent with the principles of the invention. Further, non-dependent acts may be performed in parallel.

No element, act, or instruction used in the description of the present application should be construed as critical or essential to the invention unless explicitly described as such. Also, used herein, the article "a" is intended to include one or more items. Where only one item is intended, the term "one" or similar language is used. The scope of the invention is defined by the claims and their equivalents.

What is claimed is:

1. A method, comprising:
   receiving a plurality of data units;
   precomputing a plurality of hash results associated with the data units, the precomputing a plurality of the hash results comprising:
   identifying one or more portions of the data units,
   generating hash keys based on the one or more portions of the data units, and
   performing a hash function using the hash keys to generate the precomputed hash results;
   storing the precomputed hash results in a first memory, the first memory concurrently storing the precomputed hash results associated with a plurality of the data units, each of the precomputed hash results being available for subsequent selective retrieval by a processor;
   storing the data units in a second memory;
   retrieving, by the processor, the data units from the second memory; and
   retrieving, by the processor, the precomputed hash result associated with one of the data units from the first memory in lieu of the processor performing the hash function with regard to the one data unit when the processor needs a hash result associated with the one data unit.

2. The method of claim 1, wherein the identifying one or more portions of the data units includes:
   reading a bit mask, and
   using the bit mask to select the one or more portions of the data units.

3. The method of claim 2, wherein the bit mask includes a plurality of bits corresponding to at least some of the one or more portions of the data units.

4. The method of claim 2, wherein the identifying one or more portions of the data units further includes:
   identifying a data type associated with the data units, and
   using the data type to select the bit mask from a plurality of bit masks.

5. The method of claim 1, wherein the generating hash keys includes:
   generating a plurality of hash keys for each of the data units.

6. The method of claim 5, wherein the identifying one or more portions of the data units includes:
   reading a plurality of bit masks, and
   using the bit masks to select the one or more portions of each of the data units.

7. The method of claim 1, wherein a higher bandwidth connection exists between the processor and the first memory than between the processor and the second memory.

8. The method of claim 1, further comprising:
identifying one or more second portions of the data units;
performing a checksum function using the one or more second portions of the data units to generate checksum results; and
storing the checksum results in the first memory for subsequent selective use by the processor.

9. The method of claim 8, wherein the identifying one or more second portions of the data units includes:
reading a bit mask, and
using the bit mask to select the one or more second portions of the data units.

10. The method of claim 8, further comprising:
identifying one or more third portions of the data units; and
storing the one or more third portions of the data units in the first memory for subsequent selective use by the processor.

11. The method of claim 1, further comprising:
identifying one or more second portions of the data units; and
storing the one or more second portions of the data units in the first memory for subsequent selective use by the processor.

12. The method of claim 11, wherein the identifying one or more second portions of the data units includes:
reading a bit mask, and
using the bit mask to select the one or more second portions of the data units.

13. The method of claim 1, wherein an entry in the first memory includes one of the precomputed hash results and a receive descriptor corresponding to one of the data units; and
wherein the method further comprises:
writing the receive descriptors into the first memory, the receive descriptor, corresponding to one of the data units, identifying a location in which the one of the data units is stored in the second memory.

14. A system, comprising:
means for receiving a plurality of data units;
means for precomputing a plurality of hash results associated with the data units, the means for precomputing comprising:
means for selecting one or more portions of the data units,
means for generating hash keys based on the one or more portions of the data units, and
means for performing a hash function using the hash keys to generate the precomputed hash results;
means for writing the precomputed hash results in a first memory, the first memory concurrently storing the precomputed hash results associated with a plurality of the data units, each of the precomputed hash results being available for subsequent selective retrieval by a processor;
means for writing the data units in a second memory;
means for retrieving, by the processor, the data units from the second memory; and
means for retrieving, by the processor, the precomputed hash result associated with one of the data units from the first memory in lieu of the processor performing the hash function with regard to the one data unit when the processor needs a hash result associated with the one data unit.

15. A system, comprising:
a first memory to store precomputed hash results associated with a plurality of data units;
a second memory to store information regarding the data units;
an engine to:
generate the precomputed hash results by:
selecting one or more portions of the data units,
generating hash keys based on the one or more portions of the data units, and
performing a hash function using the hash keys to generate the precomputed hash results,
store the precomputed hash results in the first memory, and
store the information regarding the data units in the second memory; and
a processor to retrieve the precomputed hash result associated with one of the data units from the first memory in lieu of performing the hash function with regard to the one data unit when the processor needs a hash result associated with the one data unit.

16. The system of claim 15, wherein the engine includes a direct memory access engine.

17. The system of claim 15, further comprising:
a hash bit mask register configured to store a bit mask associated with the data units.

18. The system of claim 17, wherein when selecting the one or more portions of the data units, the engine is configured to:
read the bit mask from the hash bit mask register, and
use the bit mask to select the one or more portions of the data units.

19. The system of claim 17, wherein the bit mask includes a plurality of bits corresponding to at least some of the one or more portions of the data units.

20. The system of claim 17, wherein when selecting the one or more portions of the data units, the engine is further configured to:
identify a data type associated with the data units, and
use the data type to select the bit mask from a plurality of bit masks.

21. The system of claim 15, wherein when generating hash keys, the engine is configured to:
generate a plurality of hash keys for each of the data units.

22. The system of claim 21, further comprising:
a plurality of hash bit mask registers configured to store a plurality of bit masks; and
wherein when selecting one or more portions of the data units, the engine is configured to:
read the bit masks from the hash bit mask registers, and
use the bit masks to select one or more portions of each of the data units.

23. The system of claim 15, wherein a higher bandwidth connection exists between the processor and the first memory than between the processor and the second memory.

24. The system of claim 15, wherein the engine is further configured to:
select one or more second portions of the data units,
perform a checksum function using the one or more second portions of the data units to generate checksum results, and
store the checksum results in the first memory for subsequent selective use by the processor.

25. The system of claim 24, further comprising:
a checksum bit mask register configured to store a bit mask associated with the data units.

26. The system of claim 25, wherein when selecting the one or more second portions of the data units, the engine is configured to:

read the bit mask from the checksum bit mask register, and use the bit mask to select the one or more second portions of the data units.

27. The system of claim 25, wherein the engine is further configured to:

select one or more third portions of the data units, and store the one or more third portions of the data units in the first memory for subsequent selective use by the processor.

28. The system of claim 27, further comprising:

a receive header store register configured to store a bit mask associated with the data units; and wherein when selecting the one or more third portions of the data units, the engine is configured to:

read the bit mask from the receive header store register, and use the bit mask to select the one or more third portions of the data units.

29. The system of claim 15, wherein the engine is further configured to:

select one or more second portions of the data units, and store the one or more second portions of the data units in the first memory for subsequent selective use by the processor.

30. The system of claim 29, further comprising:

a receive header store register configured to store a bit mask associated with the data units; and wherein when selecting the one or more second portions of the data units, the engine is configured to:

read the bit mask from the receive header store register, and use the bit mask to select the one or more second portions of the data units.

31. The system of claim 15, wherein an entry in the first memory includes one of the precomputed hash results and a receive descriptor corresponding to one of the data units; and wherein the engine is further configured to:

write the receive descriptors into the first memory, the receive descriptor, corresponding to one of the data units, identifying a location in which information regarding the one of the data units is stored in the second memory.

32. A method, comprising:

receiving a plurality of data units;

precomputing a plurality of checksum results associated with the data units, the precomputing of the checksum results comprising:

identifying one or more portions of the data units, and performing a checksum function based on the one or more portions of the data units to generate the precomputed checksum results;

storing the precomputed checksum results in a first memory, an entry in the first memory including one of the precomputed checksum results and a receive descriptor corresponding to one of the data units, the first memory concurrently storing the precomputed checksum results associated with a plurality of the data units, each of the precomputed checksum results being available for subsequent selective retrieval by a processor;

storing the data units in a second memory;

writing the receive descriptors into the first memory, the receive descriptor, corresponding to one of the data units, identifying a location in which the one of the data units is stored in the second memory;

retrieving, by the processor, the data units from the second memory; and retrieving, by the processor, the precomputed checksum result associated with one of the data units from the first memory in lieu of the processor performing the checksum function with regard to the one data unit when the processor needs a checksum result associated with the one data unit.

33. The method of claim 32, wherein the identifying one or more portions of the data units includes:

reading a bit mask, and using the bit mask to identify the one or more portions of the data units.

34. The method of claim 33, wherein the bit mask includes a plurality of bits corresponding to at least some of the one or more portions of the data units.

35. The method of claim 33, wherein the identifying one or more portions of the data units further includes:

identifying a data type associated with the data units, and using the data type to select the bit mask from a plurality of bit masks.

36. The method of claim 32, wherein the identifying one or more portions of the data units includes:

reading a plurality of bit masks, and using the bit masks to select the one or more portions of each of the data units.

37. The method of claim 32, wherein a higher bandwidth connection exists between the processor and the first memory than between the processor and the second memory.

38. The method of claim 32, further comprising:

identifying one or more second portions of the data units;

performing a hashing function using the one or more second portions of the data units to generate hash results; and storing the hash results in the first memory for subsequent selective use by the processor.

39. The method of claim 38, wherein the identifying one or more second portions of the data units includes:

reading a bit mask, and using the bit mask to identify the one or more second portions of the data units.

40. The method of claim 38, further comprising:

identifying one or more third portions of the data units; and storing the one or more third portions of the data units in the first memory for subsequent selective use by the processor.

41. The method of claim 32, further comprising:

identifying one or more second portions of the data units; and storing the one or more second portions of the data units in the first memory for subsequent selective use by the processor.

42. The method of claim 41, wherein the identifying one or more second portions of the data units includes:

reading a bit mask, and using the bit mask to select the one or more second portions of the data units.

43. A system, comprising:

a first memory to concurrently store precomputed checksum results associated with a plurality of data units, an entry in the first memory including one of the precomputed checksum results and a receive descriptor corresponding to one of the data units;

a second memory to store information regarding the data units;

an engine to:
   generate the precomputed checksum results by:
      selecting one or more portions of the data units, and
      performing a checksum function based on the one or more portions of the data units to generate the precomputed checksum results,
   store the precomputed checksum results in the first memory,
   store the information regarding the data units in the second memory, and
   write the receive descriptors into the first memory, the receive descriptor, corresponding to one of the data units, identifying a location in which the information regarding the one of the data units is stored in the second memory; and
a processor to retrieve the precomputed checksum result associated with one of the data units from the first memory in lieu of performing the checksum function with regard to the one data unit when the processor needs a checksum result associated with the one data unit.

44. The system of claim 43, wherein the engine includes a direct memory access engine.

45. The system of claim 43, further comprising:
a checksum bit mask register configured to store a bit mask associated with the data units; and
wherein when selecting the one or more portions of the data units, the engine is configured to:
   read the bit mask from the checksum bit mask register, and
   use the bit mask to select the one or more portions of the data units.

46. The system of claim 45, wherein the bit mask includes a plurality of bits corresponding to at least some of the one or more portions of the data units.

47. The system of claim 45, wherein when selecting the one or more portions of the data units, the engine is further configured to:
identify a data type associated with the data units, and
use the data type to select the bit mask from a plurality of bit masks.

48. The system of claim 43, wherein a higher bandwidth connection exists between the processor and the first memory than between the processor and the second memory.

49. The system of claim 43, wherein the engine is further configured to:
select one or more second portions of the data units,
perform a hashing function using the one or more second portions of the data units to generate hash results, and
store the hash results in the first memory for subsequent selective use by the processor.

50. The system of claim 49, wherein the engine is further configured to:
select one or more third portions of the data units, and
store the one or more third portions of the data units in the first memory for subsequent selective use by the processor.

51. A method, comprising:
receiving a plurality of data units;
precomputing a plurality of function results associated with the data units, the precomputing a plurality of function results comprising:
   selecting one or more portions of the data units, and
   performing one or more functions using the one or more portions of the data units to generate the precomputed function results;
storing the precomputed function results in a first memory, an entry in the first memory including one of the precomputed function results and a receive descriptor corresponding to one of the data units, the first memory concurrently storing the precomputed function results associated with a plurality of the data units, each of the precomputed function results being available for subsequent selective retrieval by a processor;
storing the data units in a second memory;
writing the receive descriptors into the first memory, the receive descriptor, corresponding to one of the data units, identifying a location in which the one of the data units is stored in the second memory;
retrieving, by the processor, the data units from the second memory; and
retrieving, by the processor, the precomputed function result associated with one of the data units from the first memory in lieu of the processor performing the one or more functions with regard to the one data unit when the processor needs a function result associated with the one data unit.

52. The method of claim 51, wherein the one or more functions include at least one of a hashing function, a checksum function, or a storing function.

53. A system, comprising:
a first memory to concurrently store precomputed function results associated with a plurality of data units, an entry in the first memory including one of the precomputed function results and a receive descriptor corresponding to one of the data units;
a second memory configured to store information relating to the data units;
an engine configured to:
   generate the precomputed function results by:
      selecting one or more portions of the data units, and
      performing at least one function using the one or more portions of the data units to generate the precomputed function results,
   store the precomputed function results in the first memory,
   store the information regarding the data units in the second memory, and
   write the receive descriptors into the first memory, the receive descriptor, corresponding to one of the data units, identifying a location in which the information regarding the one of the data units is stored in the second memory; and
a processor to retrieve the precomputed function result associated with one of the data units from the first memory in lieu of performing the at least one function with regard to the one data unit when the processor needs a function result associated with the one data unit.

54. The system of claim 53, wherein the at least one function includes at least one of a hashing function, a checksum function, or a storing function.

55. A network device, comprising:
a first memory to store data units;
a processor to operate upon the data units; and
an interface connected to the first memory and the processor, the interface comprising:
   a second memory to store precomputed function results associated with the data units, an entry in the second memory including one of the precomputed function results and a receive descriptor corresponding to one of the data units, and an engine to:
> generate the precomputed function results by:
> > determining types of the data units,
> > identifying one or more bit masks based on the types of the data units, the one or more bit masks including a plurality of bits corresponding to at least some portions of the data units,
> > using the one or more bit masks to select one or more portions of the data units, and
> > performing at least one function using the one or more portions of the data units to generate the precomputed function results, store the precomputed function results in the second memory, store the data units in the first memory, and
>
> write the receive descriptors into the second memory, the receive descriptor, corresponding to one of the data units, identifying a location in which the one of the data units is stored in the first memory;
>
> the processor being configured to retrieve the precomputed function result associated with one of the data units from the second memory in lieu of performing the at least one function with regard to the one data unit when the processor needs a function result associated with the one data unit.

56. The network device of claim 55, wherein the at least one function includes at least one of a hashing function, a checksum function, or a storing function.

* * * * *